United States Patent Office 3,533,997
Patented Oct. 13, 1970

3,533,997
CROSSLINKABLE POLYAMIDE-ACIDS AND POLYIMIDES AND CROSSLINKED POLYMERIC PRODUCTS MADE THEREFROM
Rudolf J. Angelo, Wilmington, Del., assignor to E. I. du Pont de Nemours and Company, Wilmington, Del., a Corporation of Delaware
No Drawing. Continuation of application Ser. No. 546,562, May 2, 1966. This application May 28, 1969, Ser. No. 828,706
Int. Cl. C08g 29/32
U.S. Cl. 260—47  8 Claims

ABSTRACT OF THE DISCLOSURE

Crosslinkable linear aromatic polyamide-acids and linear aromatic polyimides containing functional carbonyl groups, and crosslinked polymers obtained upon reaction of said polyamide-acids or polyimides with certain amines, such as ethylene-diamine, useful as adhesives and coatings.

---

This invention relates to crosslinked polymers and to their crosslinkable polymeric precursors.

The present application is a continuation application of copending application Ser. No. 546,562 filed May 2, 1966 and now abandoned.

This invention provides novel linear polyamide-acids and linear polyimides having available functional carboxyl groups. The invention also provides novel crosslinked polymer products formed by reaction of such polyamide-acids and polyimides with an oligo-primary and/or secondary amine.

The presence of the free carboxyl groups in the polyamide-acids and polyimides of this invention makes them particularly useful as adhesives and as chemical precursors readily suitable for conversion to crosslinked polymeric materials or for reaction with other agents to provide a large number of other materials, e.g., salts, esters, acid halides, amides, etc. With the presence of the functional carboxyl group, the adhesive, cohesive, rheological and solution properties of the polyamide-acids and polyimides can be altered by crosslinking or other reactions to meet specific needs without substantial loss of the desirable mechanical, electrical, thermal and other qualities of the polyamide-acids and polyimides. For example, the crosslinked product adds desired rigidity to finished products in such applications as adhesives, coatings, etc.

The novel polyamide-acid and polyimide polymers of this invention are those consisting essentially of at least one of the following recurring structural units:

(1) 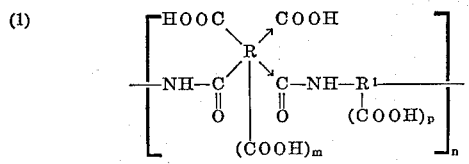

and (2) 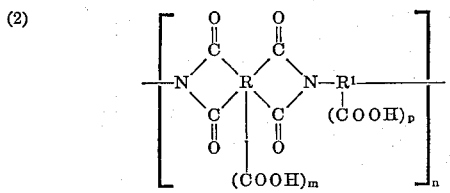

where
the arrows denote isomerism;
R is a radical selected from the group consisting of

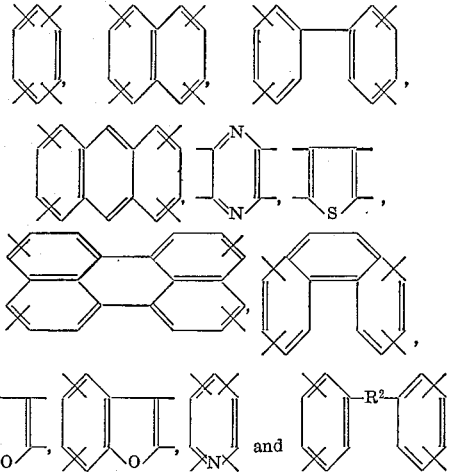

where $R^2$ is selected from the group consisting of an alkylene chain having 1–3 carbon atoms,

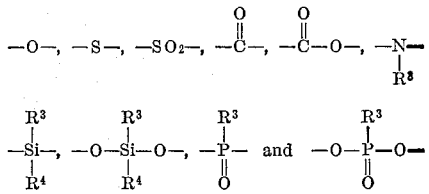

where $R^3$ and $R^4$ are selected from the group consisting of alkyl and aryl.

$R^1$ is a radical selected from the group consisting of

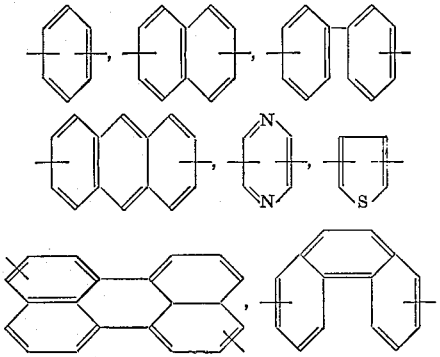

where $R^2$ has the same meaning as above;
$m$ and $p$ are positive integers selected from the group consisting of 0, 1 and 2;
the sum of $m$ plus $p$ is sufficient to provide at least one such —COOH group indicated by $m$ and $p$ per each thirty of said recurring structural units; and
$n$ is a number sufficient that said polymer has an inherent viscosity of at least 0.1 as measured at 30° C. on an 0.5% by weght solution in concentrated sulfuric acid.

Thus, it will be understood that the polymers defined above can be from 0 to 100% polyamide-acid units of Formula 1 above and from 100% to 0 polyimide units of Formula 2 above.

In other words, the polymers of this invention are aromatic polyamide-acids and polyimides containing free carboxyl groups in at least a portion of the aromatic carboxylic acid units or a portion of the aromatic diamine units.

The above polymers can be prepared by condensation polymerization procedures known in the art and described for example in Edwards U.S. Pat. No. 3,179,614; Endrey U.S. Pat. No. 3,179,630; Endrey U.S. Pat. No. 3,179,633; and Edwards U.S. Pat. No. 3,179,634; all issued Apr. 20, 1965.

Using the techniques described in the patents just mentioned, one or more aromatic tetracarboxylic acid dianhydrides is reacted with one or more aromatic diamines of structures such as to obtain the above defined polyamide-acid which is then converted to polyimide by thermal or chemical means or both, as described in those patents. It is only necessary that the starting materials be carboxyl substituted to an extent sufficient to meet the requirement that the resulting polyamide-acid or polyimide have at least one free carboxyl group per each 30 of the indicated recurring structural units. Thus, the starting materials can be (a) a carboxyl-substituted aromatic diamine and an aromatic tetracarboxylic acid dianhydride, or (b) an aromatic diamine and a carboxyl-substituted aromatic tetracarboxylic acid dianhydride, or (c) a carboxyl-substituted aromatic diamine and a carboxyl-substituted tetracarboxylic acid dianhydride, or any of the (a), (b) and (c) combinations together with any other number of such diamines and/or tetracarboxylic acid dianhydrides, with or without one or more free-carboxyl substituents.

When one of the reactants is a carboxyl-substituted aromatic diamine, the amino groups and carboxyl group are bonded directly to a benzenoid ring, and may be bonded to any benzenoid ring when two or more are present; and the amino groups are situated in positions other than ortho relative to each other. Representative carboxy-substituted diamines are the following, with preferred compounds indicated by the letter (P) following the name of the diamine:

2,4-diaminobenzoic acid
2,5-diaminobenzoic acid
2,6-diaminobenzoic acid
3,5-diamonobenzoic acid (P)
o-(2,4-diaminophenyl) benzoic acid
m-(2,4-diaminophenyl) benzoic acid
p-(2,4-diaminophenyl) benzoic acid (P)
o-(2,5-diaminophenyl) benzoic acid
m-(2,5-diaminophenyl) benzoic acid
p-(2,5-diaminophenyl) benzoic acid (P)
o-(2,6-diaminophenyl) benzoic acid
m-(2,6-diaminophenyl) benzoic acid
p-(2,6-diaminophenyl) benzoic acid (P)
o-(3,5-diaminophenyl) benzoic acid
m-(3,5-diaminophenyl) benzoic acid
p-(3,5-diaminophenyl) benzoic acid (P)
benzidine-2-carboxylic acid
benzidine-2,2'-dicarboxylic acid
2,2'-dicarboxy-4,4'-diaminodiphenyl ether
2-carboxy-4,4'-diaminodiphenyl ether
4-carboxy-2',4'-diaminodiphenyl ether
4,4'-diaminodiphenylmethane-3-carboxylic acid
2-(3,5-diaminophenyl)-2-(4-carboxyphenyl) propane
2-carboxy-4,4'-diaminodiphenyl sulfide
2-carboxy-4,4'-diaminodiphenyl sulfone
4,4'-diaminobenzophenone-2-carboxylic acid
mono(3,5-diaminophenyl) terephthalate
N-(3,5-diaminophenyl)-isophthalamic acid
bis(4-aminophenyl)-(4-carboxyphenyl)amine
bis(3-aminophenyl)-(4-carboxyphenyl)phosphine oxide
N,N-bis(4-aminophenyl)-terephthalamic acid
bis(4-aminophenyl)-(4-carboxyphenyl)methylsilane
bis(4-aminophenyl)-(4-carboxyphenyl)phosphonate
(4-aminophenyl)-(4-amino-2-carboxyphenyl-diethyl-siloxane
(4-aminophenyl)-(4-amino-2-carboxyphenyl)-N-methyl-amine
1,5-diaminonaphthalene-3-carboxylic acid
1,4-diaminonaphthalene-6-carboxylic acid
(4-aminophenyl)-(4-amino-2-carboxyphenyl)-phenylphosphine oxide Carboxyl-containing dianhydrides, are, for example, 3-carboxy pyromellitic dianhydride and mellitic acid dianhydride (3,6-dicarboxy pyromellitic dianhydride).

Besides the polyamide-acid route, the polyimides of this invention can also be prepared by the use of carboxyl-substituted polyimide precursors other than polyamide-acids, such as polyisoimides according to procedures described in Angelo U.S. patent application Ser. No. 325,479 filed Nov. 21, 1963, now U.S. Pat. No. 3,282,898; polyamide-esters according to procedures described in Angelo U.S. patent application Ser. No. 311,307 filed Sept. 25, 1963, now U.S. Pat. No. 3,316,211, Angelo U.S. patent application Ser. No. 311,326 filed Sept. 25, 1963, now U.S. Pat. No. 3,282,897, Sorenson U.S. patent application Ser. No. 288,535 filed June 17, 1963, now U.S. Pat. No. 3,312,663 Tatum U.S. patent application Ser. No. 325,497 filed Nov. 21, 1963, now U.S. Pat. No. 3,261,811 and Tocker U.S. patent application Ser. No. 332,889 filed Dec. 23, 1963, now U.S. Pat. No. 3,326,851; and polyamide-amides according to procedures described in Angelo and Tatum U.S. patent application Ser. No. 325,442 filed Nov. 21, 1963, now U.S. Pat. No. 3,316,212; all assigned to the same assignee as that of the present application.

As mentioned above, the novel crosslinked polymer products of this invention are prepared by reaction of the above carboxyl-substituted polyamide-acids and polyimides with an oligo-primary and/or secondary amine. This includes di-, tri- and tetra-amines where each amine function is primary or secondary. The only structural requirement of the polyamine is that it contain at least two

groups. The polyamine will preferably be used in the form of an organic acid salt.

Representative organic acids which readily react with the polyamines to form the highly useful acid salts include acetic, propionic, n-butyric, valeric, monochloroacetic, dichloroacetic, trichloroacetic, benzene sulfonic, p-toluene sulfonic and salicylic acids.

The resulting crosslinked polymers are useful as films, coatings, fibers, papers, wire enamels, impregnants and adhesives. They have excellent properties over a broad use-temperature range and provide an array of materials with a combination of density, and mechanical, electrical and thermal properties suitable for many such uses.

The crosslinking, as will be seen, results in dicarboxamide units which are attached through the carbon atoms of the carboxamide groups directly to aromatic rings of the polyamide-acid or polyimide chains. The amino nitrogens of the crosslinking polyamine attach to the carbonyl carbons of the free carboxyl groups available for crosslinking, with the nitrogens replacing the —OH radicals of these free carboxyl groups.

The nucleus of the useful crosslinking polyamines can be any di-, tri-, or tetravalent radical of 2 through 20 carbon atoms. The group can be aliphatic, alicyclic, aromatic, heterocyclic, mixed aliphatic-aromatic, etc. Preferably, the polyamine nucleus (ignoring indicated valences) is of the same groups as shown for R above.

The amount of crosslinking will depend on such factors as the incidence of available carboxyl sites and the amount of polyamine or polyamines used, both factors being determined by the nature of the effect desired. It will be convenient to use an amount of polyamine, preferably as an acid salt thereof, substantially equivalent on a molar functional group basis to the amount of free carboxyl groups in the polymer.

Representative useful crosslinking polyamines include the following:

ethylenediamine
propylenediamine
trimethylenediamine
tetramethylenediamine
hexamethylenediamine
heptamethylenediamine
octamethylenediamine
nonamethylenediamine
decamethylenediamine
3-methylheptamethylenediamine
2,2-dimethylpropylenediamine
4,4-dimethylheptamethylenediamine
1,1,3-trimethylpropylenediamine
1,1,6,6-tetramethylhexamethylenediamine
3,3-dimethylpentamethylenediamine
bis(3,4-diaminophenyl) ether
bis(4-(beta-aminoethylamino)phenyl) ether
3-methylhexamethylenediamine
3-methoxyhexamethylenediamine
2,5-dimethylhexamethylenediamine
2,2,5,5-tetramethylhexamethylenediamine
2,11-diaminododecane
2,17-diaminoeicosane
2,4-bis(beta-amino-t-butyl)toluene
bis-(para-beta-amino-t-butylphenyl) ether
bis-(3-aminopropyl) ether
1,2-bis-(3-aminopropoxy)ethane
1,2-bis-(3-aminopropoxy)propane
2,5-dimethylheptamethylenediamine
9,9-bis-(3-aminopropyl)fluorene
m-xylylenediamine
p-xylylenediamine
m-phenylenediamine
p-phenylenediamine
4,4'-diaminodiphenylpropane
4,4'-diaminodiphenylmethane
benzidine
3,3'-dimethoxybenzidine
4,4'-diaminodiphenyl sulfide
4,4'-diaminodiphenyl sulfone
3,3'-diaminodiphenyl sulfone
4,4'-diaminodiphenyl ether
2,6-diaminopyridine
bis-(4-aminophenyl)diethylsilane
bis-(4-aminophenyl)phenylphosphine oxide
bis-(4-aminophenyl)-N-methylamine
N,N'-bis-(gamma-aminopropyl)benzidine
triethylenetetramine
1,5-diaminonaphthalene
3,3'-dimethyl-4,4'-diaminobiphenyl
para-bis-(2-methyl-4-aminopentyl)benzene
para-bis-(1,1-dimethyl-5-aminopentyl)benzene
bis(para-aminocyclohexyl)methane
1,4-diaminocyclohexane
1,12-diaminooctadecane
$H_2N(CH_2)_3S(CH_2)_3NH_2$
$H_2N(CH_2)_3N(CH_3)(CH_2)_3NH_2$
3,4'-diaminobenzanilide
4,4'-diaminobenzanilide
3,3'-diaminobenzanilide
3,2'-diaminobenzanilide
4,2'-diaminobenzanilide
2,4'-diaminobenzanilide
2,3'-diaminobenzanilide
4,3'-diaminobenzanilide
4-(aminophenyl)-3-aminobenzoate
2,2'-diaminobenzophenone
3,3'-diaminobenzophenone
3,4'-diaminobenzophenone
4,4'-diaminobenzophenone
bis-(3-aminopropyl)amine
diethylenetriamine
N,N'-dimethylhexamethylenediamine
N,N'-diethyl-m-phenylenediamine
N-methyl-p-phenylenediamine
1,3,5-triaminobenzene
piperazine
2,5-dimethylpiperazine The reaction which effects the desired crosslinking can be carried out using conventional techniques, illustrated below The crosslinking agent can be incorporated in the polymer before or after the polymer is shaped, and before or after the polyamide-acid is converted partly or all to polyimide. Preferably, prior to conversion of the polyamide-acids of this invention into the polyimides, the solvent-soluble polyamide-acid will be coated onto any of various substrates, or formed into the desired shape such as a film, fiber, tube, etc. The substrates can be metals, inorganic materials such as glass, mica and asbestos, or organic polymers. Representative metals are copper, aluminum and steel. Glass and the organic polymers can be in the form of sheets, films, woven or non-woven fabrics, etc.

The crosslinking of this invention is particularly useful in the adhesives industry, in which polyimides are finding their way, to permit application of high solids solutions of a workable viscosity which will readily wet the surfaces which are to be bonded together. By means of crosslinking, the adhesive becomes insoluble and less fusible at the temperature at which the bond is made. As a result the bond retains good strength but is no longer solvent-sensitive or fusible at functional temperatures.

The invention will be further understood by reference to the following illustrative examples in which parts and percentages are by weight unless otherwise indicated.

EXAMPLE 1

To a solution of 7.60 grams (0.05 mole) of 3,5-diaminobenzoic acid in 104.5 grams of DMAC (N,N-dimethylacetamide) was added 10.90 grams (0.05 mole) of pyromellitic dianhydride over 25 minutes. There was a slight warming with each addition of the dianhydride and a slight overall increase in viscosity. The mixture was stirred for 1 hour after all of the dianhydride had been added. The inherent viscosity of the resulting polyamide-acid was 0.32 (0.5% by weight in DMAC at 30° C.). A clear, self-supporting film was obtained by casting the reaction solution onto a glass plate and drying in a 120° C. oven for about 10 minutes. This polymer was characterized as the desired polyamide-acid by infrared inspection of a sample of solution deposited on a KBr pellet and then dried at about 100° C. for several hours. On drying at 100° C. for 6 days in a vacuum oven under nitrogen, a sample of polymer on a KBr pellet showed a considerable amount of conversion to the corresponding polyimide (imide carbonyl absorption at 5.63 and 5.8 millimicrons). There was also evidence of absorption corresponding to the pendant carboxyl group.

The polyamide-acid solution as obtained from the polymerization reaction above was painted onto one side of one end of each of two ½ inch wide aluminum strips. These painted portions were dried slightly and then pressed together at 250, 300 and 350° C. for 3 minutes under a pressure of 50–100 pounds per square inch. In each of the three cases, the lap joints were found to be quite tight. Corresponding lap joints heated for 10 minutes under the same conditions were measured and found to have strengths of 244, 126 and 196 pounds per square inch, respectively.

EXAMPLE 2

Example 1 was repeated with a more highly purified sample of 3,5-diaminobenzoic acid. The inherent viscosity of the product was 1.03 (0.5% by weight in DMAC at 30° C.). In this case also it was possible to obtain a clear, self-supporting film by casting the reaction mixture onto a glass plate and drying at 65–70° C. in an air oven for 15 minutes. Again the polyamide-acid structure was confirmed by IR spectra. A sample of the polyamide-acid film was converted to the corresponding polyimide by heating in a vacuum oven under nitrogen at 300° C. Infrared absorption at 5.65 and 5.8 millimicrons indicated conversion to polyimide, and a broad peak at about 3.5–4.0 millimicrons indicated pendant carboxyl groups.

A sample of the polyamide-acid film was soaked in a solution of acetic anhydride and pyridine (50/50 by volume) for 24 hours. This film turned to a bright yellow color and was tough and flexible. It was washed with benzene and then dried in a vacuum oven under nitrogen at 50–60° C.

Aluminum lap joints were prepared from the polyamide-acid solution of this experiment by heating at 250° C. for 10 minutes at 50–100 pounds per square inch, and also at 300 and 350° C. The measured lap joints from samples made at these temperatures were 1144, 724 and 820 pounds per square inch, respectively. Lap joints on etched stainless steel, prepared in the same manner as for aluminum, were 476, 640 and 446 pounds per square inch, respectively. When the same solution was painted onto a film of the polypyromellitimide of bis(4-aminophenyl) ether, and the treated faces of film were heated together at 300° C., 350° C. and 400° C. for 30 seconds under 90 pounds pressure, the resulting peel strengths were 1140, 285 and 318 pounds per square inch, respectively.

A sample of this carboxy-substituted polyimide film had the following properties:

Modulus—445,000 p.s.i.
Tensile—1,100 p.s.i.
Elongation—5.2%
Zero strength temperature—800±20° C.
Density—1.469 g./cc.
Dielectric constant—10.9
Dissipation factor—0.18
Volume resistivity—$1 \times 10^9$

EXAMPLE 3

When 6.00 grams (0.04 mole) of 2,4-diaminoisopropylbenzene was substituted for the corresponding molar amount of 3,5-diaminobenzoic acid and the resulting diamine mixture of 0.04 mole of 2,4-diaminoisopropylbenzene and 0.01 mole of 3,5-diaminobenzoic acid was subjected to the polymerization procedure of Example 1, a copolyamide-acid was obtained having an inherent viscosity of 0.60 (0.5% solution by weight in DMAC at 30° C.).

A 12.1 gram portion of the resulting polyamide-acid solution was treated with 1.02 gram of acetic anhydride and 0.79 gram of pyridine by stirring these agents into the solution at room temperature. After 15 minutes, a film was cast from the solution onto a glass plate and dried in an oven at 125° C. A yellow, tough, flexible film was obtained. IR spectra showed that this film was a polyimide, with an indication of pendant carboxyl groups.

EXAMPLE 4

Another copolyamide-acid solution was obtained by the procedure of Example 1. In this case, 2.72 grams (0.02 mole) of meta-xylylenediamine and 2.00 grams (0.01 mole) of bis(4-aminophenyl) ether was used in conjunction with 1.52 grams (0.01 mole) of 3,5-diaminobenzoic acid as the diamine mixture. The dianhydride was a mixture of 4.36 grams (0.02 mole) of pyromellitic dianhydride and 8.36 grams (0.026 mole) of 3,4,3',4'-benzophenone tetracarboxylic dianhydride. The inherent viscosity of the resulting copolyamide-acid was 0.34 (0.5% by weight in DMAC at 30° C.). Lap joints on aluminum strips, made by using this copolyamide-acid solution as the adhesive layer, adhered tightly after heating at 250, 300 and 350° C. for 10 minutes under 50–100 pounds per square inch pressure.

EXAMPLE 5

Again using the polymerization procedure of Example 1, 21.80 grams (0.10 mole) of pyromellitic dianhydride was condensed with a mixture of diamines consisting of 9.48 grams (0.06 mole) of 1,9-diaminononane, 0.90 gram (0.01 mole) of 1,3-diaminopropanol-2, 1.52 gram (0.01 mole) of 3,5-diaminobenzoic acid and 4.00 grams (0.02 mole) of bis(4-aminophenyl) ether. The copolyamide-acid solution was cast onto a glass plate at 135° C. to give a clear film which adhered tightly to the glass plate. The inherent viscosity of the polymer was 0.43 (0.5% by weight in DMAC at 30° C.). Aluminum lap joints were made at 250, 300 and 350° C. for 3 minutes under 50–100 pounds per square inch pressure. The aluminum strips adhered tightly to each other. The strengths of the similar lap joints, made by heating for 10 minutes each, measured 654, 734 and 1,056 pounds per square inch, respectively. Lap joints on etched stainless steel made at 300° C. and 350° C. (10 minutes, 50–100 pounds per square inch) measured 980 and 446 pounds per spuare inch, respectively.

EXAMPLE 6

Another copolyamide-acid containing both hydroxyl and extra carboxyl groups was prepared by the procedure of Example 1, using 21.80 grams (0.10 mole) of pyromellitic dianhydride and, as the diamine, a mixture of 5.00 grams (0.025 mole) of bis(4-aminophenyl) ether, 5.00 grams (0.025 mole) of 2,4-diaminodiphenyl ether, 6.32 grams (0.040 mole) of 1,9-diaminononane, 0.45 gram (0.005 mole) of 1,3-diaminopropanol-2 and 0.76 gram (0.005 mole) of 3,5-diaminobenzoic acid. This copolyamide-acid had an inherent viscosity of 0.81 (0.5% by weight in DMAC at 30° C.). The concentrated solution produced a clear, tightly adhering film when cast onto a glass plate. The polymer was precipitated from a small portion of the solution by addition of ethyl acetate, giving a white, fibrous precipitate which was dried in an oven at about 75° C. for an hour under nitrogen. This polymer was pressed at 300° C. under 35 tons pressure for 30–60 seconds to give a clear, flexible, tough, yellow film. The IR spectra of this film showed characteristic polyimide absorptions.

Metal lap joints were prepared as described above, giving the following results:

½ INCH LAP JOINTS ON ETCHED ALUMINUM

| Temp., ° C./mins./p.s.i. | Comments | Measured lap joints, p.s.i. |
| --- | --- | --- |
| 250/10/50–100 | Adhered tightly | 656 |
| 300/10/50–100 | do | 956 |
| 350/10/50–100 | do | 940 |

½ INCH LAP JOINTS ON ETCHED STAINLESS STEEL

| | | |
| --- | --- | --- |
| 250/10/50–100 | Adhered tightly | 626 |
| 300/10/50–100 | do | 680 |
| 350/10/50–100 | do | 144 |

EXAMPLE 7

To a solution of 6.00 grams (0.04 mole) of cumene diamine (2,4-diaminoisopropylbenzene) and 1.52 gram (0.01 mole) of 3,5-diaminobenzoic acid in 104 grams of DMAC (N,N- dimethylacetamide) was added with stirring 10.90 grams (0.05 mole) of pyromellitic dianhydride. Reaction was indicated by an exotherm and an increase of viscosity. After 5.5 hours of stirring at room temperature the copolyamide-acid had an inherent viscosity (0.5% solution in DMAC at 30° C.) of 0.60 (product A). A 12.1 gram portion of the resulting copolyamide-acid solution was treated with 1 gram of acetic anhydride and 0.8 gram of pyridine by stirring these agents into the solution at room temperature (product B). After 15 minutes, a film was cast from the solution and dried in an oven at 125° C. A yellow, tough, flexible film with IR characteristics of a polyimide resulted. The product was thus a soluble copolyimide. The polyimide structure was verified by precipitation of the polymer solution with ethylacetate and examination of the IR spectrum (conversion to imide structure observed).

To another portion of the copolyimide solution was added a solution of m-xylylene diamine in DMAC. Almost immediate gelation occurred, indicative of an ion crosslinking reaction. To another portion of the chemically converted copolyimide solution was added a DMAC solution containing equivalent amounts of m-xylylene diamine and acetic acid (product C). No gelation occurred, and the solution could then be coated onto a film of the polypyromellitimide of bis(4-aminophenyl) ether to form heat sealable coatings. These coated films were heat-seled in a press at 350 and 400° C., respectively, under the conditions indicated in the table which follows.

As a second type of control, this example was repeated using the same procedure and starting materials except that 1.08 gram (0.01 mole) of m-phenylene diamine was used instead of 1.52 gram (0.01 mole) of 3,5-diaminobenzoic acid. The resulting copolyamide-acid was exactly like the product of Example 7 except that it lacks pendant carboxyl groups. The copolyamide-acid had an inherent viscosity of 0.56 (product D), and was also converted with acetic anhydride and pyridine to the soluble copolyimide (product E), and coatings on a film of the polypyromellitimide of bis(4-aminophenyl) ether were prepared for testing of heat seals. While the polyamide-acid solutions in DMAC reacted with formation of ion crosslinks upon addition of m-xylylene diamine, no gelation occurred on reacting m-xylylene diamine with the cyclized polyimide solutions. This indicates that crosslinking polyimides by this technique requires a pendant carboxyl group not utilized in the imide cyclization step. The corresponding peel strength results of the heat seals prepared from a film of the polypyromellitimide of bis(4-aminophenyl) ether coated with this polyamide-acid or polyimide are also listed in the table which follows.

The values in the following table are Peel Strength (grams per inch) and are an average of 5 or 6 seals on 3-mil thick film, the seals having been made at the indicated temperatures at 150 pounds per square inch pressure for 30 seconds.

EFFECT OF CROSSLINKING ON HEAT SEALS

| Composition | 350° C. | 400° C. |
|---|---|---|
| (A) Polyamide-acid from cumene diamine 3,5-diaminobenzoic acid, and pyromellitic dianhydride | 250 | 515 |
| (B) Soluble polyimide from Product A | 470 | 315 |
| (C) Soluble polyimide from Product A treated with crosslinking reagent, m-xylenediamine/acetic acid | 460 | 820 |
| (D) Polyamine-acid from cumene diamine m-phenylene diamine and pyromellitic dianhydride | 270 | 555 |
| (E) Soluble polyimide from Product D | 410 | 350 |

From the table it can be seen that the highest peel strength is reached with heat seals made from the crosslinked polyimide, whereas lower values were obtained with non-crosslinked polyimide and/or non-cyclized polyamide acid.

EXAMPLE 8

Example 7 was repeated, using in place of the materials specified, 8.0 grams (0.04 mole) of p,p'-diaminodiphenyl ether and 1.52 gram (0.01 mole) of 3,5-diaminobenzoic acid, in DMAC solution with 10.90 grams (0.05 mole) of pyromellitic dianhydride. The reactions and results are substantially like those obtained in Example 7.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

What is claimed is:
1. The polyamide-acid polymer consisting essentially of the recurring structural unit

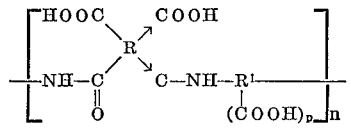

where
the arrows denote isomerism;
R is a radical selected from the group consisting of

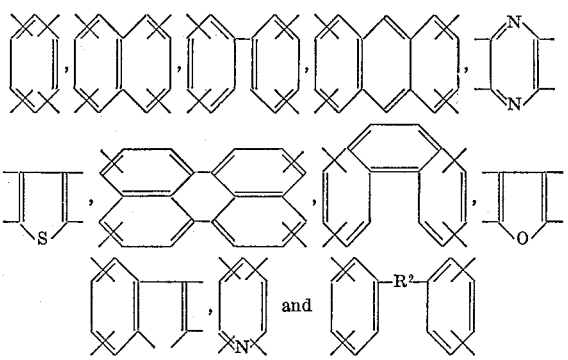

where $R^2$ is selected from the group consisting of an alkylene chain having 1–3 carbon atoms, —O—,

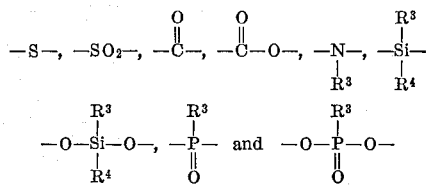

where $R^3$ and $R^4$ are selected from the group consisting of alkyl and aryl;

$R^1$ is a radical selected from the group consisting of

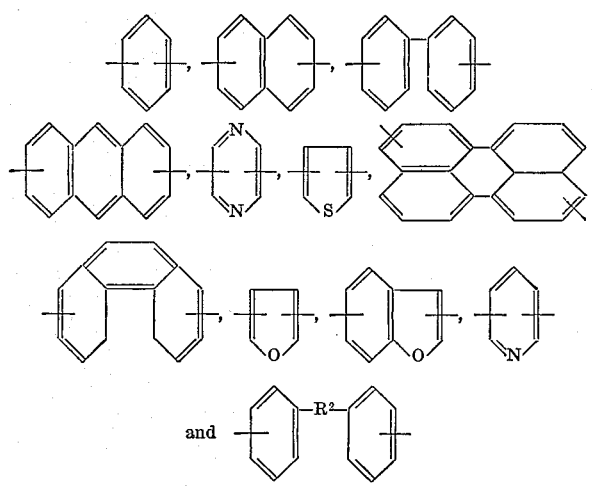

where $R^2$ has the same meaning as above;
p is zero or a positive integer providing at least one such —COOH group indicated by p per each thirty of said recurring structural units; and
n is a number sufficient that said polymer has an inherent viscosity of at least 0.1 as measured at 30° C. on an 0.5% by weight solution in concentrated sulfuric acid.

2. The polyimide polymer consisting essentially of the recurring structural unit $$\left[ \begin{array}{c} \underset{\underset{O}{\overset{O}{\|}}}{\overset{\overset{O}{\|}}{C}}\\ -N\underset{\underset{C}{\overset{}{}}}{\overset{C}{}}R\underset{\underset{C}{\overset{}{}}}{\overset{C}{}}N-R^1- \\ \underset{O}{\overset{O}{\|}} \quad \underset{O}{\overset{O}{\|}} \quad (COOH)_p \end{array} \right]_n$$

where
R is a radical selected from the group consisting of

[chemical structures: various aromatic/heterocyclic divalent radicals including benzene, naphthalene, biphenyl, anthracene-type, pyridine, thiophene, furan, pyrrole rings]

and

[structure showing two aromatic rings connected by $-R^2-$]

where $R^2$ is selected from the group consisting of an alkylene chain having 1–3 carbon atoms, —O—, $$-S-, \ -SO_2-, \ -\underset{\underset{}{}}{\overset{\overset{O}{\|}}{C}}-, \ -\underset{\underset{}{}}{\overset{\overset{O}{\|}}{C}}-O-, \ -\underset{\underset{R^3}{}}{\overset{}{N}}-, \ -\underset{\underset{R^4}{}}{\overset{\overset{R^3}{}}{Si}}-$$

$$-O-\underset{\underset{R^4}{}}{\overset{\overset{R^3}{}}{Si}}-O-, \ -\underset{\underset{O}{\overset{\|}{O}}}{\overset{\overset{R^3}{}}{P}}- \ \text{and} \ -O-\underset{\underset{O}{\overset{\|}{O}}}{\overset{\overset{R^3}{}}{P}}-O-$$

where $R^3$ and $R^4$ are selected from the group consisting of alkyl and aryl;
$R^1$ is a radical selected from the group consisting of

[chemical structures: various aromatic/heterocyclic divalent radicals]

and

[structure showing two aromatic rings connected by $-R^2-$]

where $R^2$ has the same meaning as above;
p is zero or a positive integer providing at least one such —COOH group indicated by p per each thirty of said recurring structural units; and
n is a number sufficient that said polymer has an inherent viscosity of at least 0.1 as measured at 30° C. on an 0.5% by weight solution in concentrated sulfuric acid.

3. A crosslinked polyimide polymer which is the reaction product of a polyimide polymer according to claim 2 and an organic amine containing two to twenty carbon atoms and two to four amino radicals per molecule, said amino radicals being of the group consisting of primary and secondary amino radicals, said crosslinking occurring through attachment of amino nitrogens of said organic amine to carbonyl carbon atoms of free carboxyl radicals of said polyimide polymer.

4. The crosslinked polymer of claim 3 in which said organic amine is in the form of an organic acid salt.

5. A polyamide-acid polymer consisting essentially of the recurring structural unit $$\left[ \begin{array}{c} HOOC \quad COOH \\ \diagdown R \diagup \\ -NH-\underset{\underset{O}{\overset{\|}{}}}{C} \quad \underset{\underset{O}{\overset{\|}{}}}{C}-NH-R^1- \\ (COOH)_m \quad (COOH)_p \end{array} \right]_n$$

where
the narrows denote isomerism;
R is

[chemical structure]

$R^1$ is a radical selected from the group consisting of

[chemical structures: various aromatic/heterocyclic divalent radicals]

and

[structure showing two aromatic rings connected by $-R^2-$]

where $R^2$ is selected from the group consisting of an alkylene chain having 1–3 carbon atoms, —O—, $$-S-, \ -SO_2-, \ -\overset{\overset{O}{\|}}{C}-, \ -\overset{\overset{O}{\|}}{C}-O-, \ -\underset{\underset{R^3}{}}{\overset{}{N}}-$$

$$-\underset{\underset{R^4}{}}{\overset{\overset{R^3}{}}{Si}}-, \ -O-\underset{\underset{R^4}{}}{\overset{\overset{R^3}{}}{Si}}-O-, \ -\underset{\underset{O}{\overset{\|}{}}}{\overset{\overset{R^3}{}}{P}}- \ \text{and} \ -O-\underset{\underset{O}{\overset{\|}{}}}{\overset{\overset{R^3}{}}{P}}-O-$$

where $R^3$ and $R^4$ are selected from the group consisting of alkyl and aryl;
m and p are positive integers selected from the group consisting of 0, 1 and 2;
the sum of m plus p is sufficient to provide at least one such —COOH group indicated by m and p per each thirty of said recurring structural units; and $n$ is a number sufficient that said polymer has an inherent viscosity of at least 0.1 as measured at 30° C. on an 0.5% by weight solution in concentrated sulfuric acid.

6. A polyimide polymer consisting essentially of the recurring structural unit

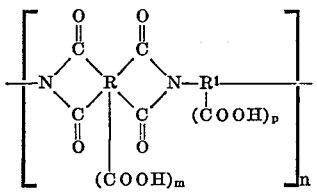

where R is

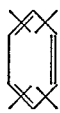

$R^1$ is a radical selected from the group consisting of

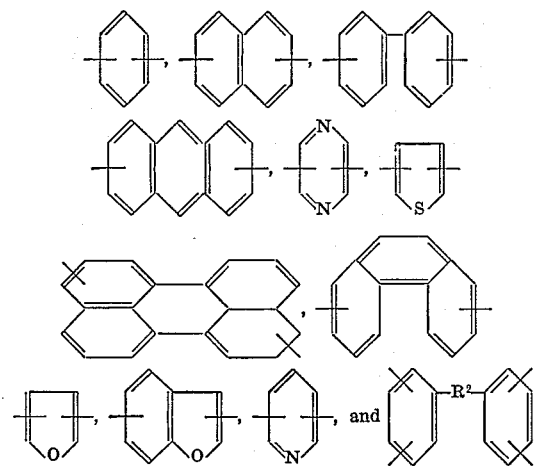

where $R^2$ is selected from the group consisting of an alkylene chain having 1–3 carbon atoms, —O—,

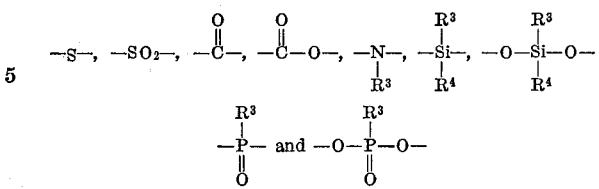

where $R^3$ and $R^4$ are selected from the group consisting of alkyl and aryl;

$m$ and $p$ are positive integers selected from the group consisting of 0, 1 and 2;

the sum of $m$ plus $p$ is sufficient to provide at least one such —COOH group indicated by $m$ and $p$ per each thirty of said recurring structural units; and $n$ is a number sufficient that said polymer has an inherent viscosity of at least 0.1 as measured at 30° C. on an 0.5% by weight solution in concentrated sulfuric acid.

7. A crosslinked polyimide polymer which is the reaction product of a polyimide polymer according to claim 6 and an organic amine containing two to twenty carbon atoms and two to four amino radicals per molecule, said amino radicals being of the group consisting of primary and secondary amino radicals, said crosslinking occurring through attachment of amino nitrogens of said organic amine to carbonyl carbon atoms of free carboxyl radicals of said polyimide polymer.

8. The crosslinked polymer of claim 7, in which said organic amine is in the form of an organic acid salt.

References Cited

UNITED STATES PATENTS 3,179,614　4/1965　Edwards _____ 260—30.2
3,338,859　8/1967　Green _____ 260—30.2

WILLIAM H. SHORT, Primary Examiner

L. L. LEE, Assistant Examiner

U.S. Cl. X.R.

117—124, 126, 128.4, 132, 161; 161—214; 260—32.6, 65, 78

PO-1050
(5/69)

UNITED STATES PATENT OFFICE
CERTIFICATE OF CORRECTION

Patent No. 3,533,997                Dated  October 13, 1970

Inventor(s)          Rudolf J. Angelo

It is certified that error appears in the above-identified patent and that said Letters Patent are hereby corrected as shown below:

Column 1, line 5, "Rudolf" should read -- Rudolph --;
Column 3, line 74, "(4-aminophenyl)-(4-amino-2-carboxyphenyl-diethyl-siloxane" should read -- (4-aminophenyl)-(4-amino-2-carboxyphenyl)-diethyl-siloxane --;  Column 9, line 15, "heat-seled" should read -- heat-sealed --; Column 10, line 60, the structural formula reading

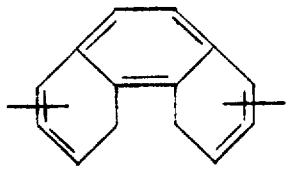         should read         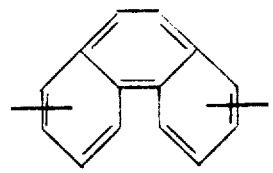

Column 11, line 19, the structural formula reading

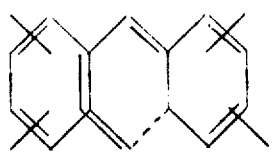         should read         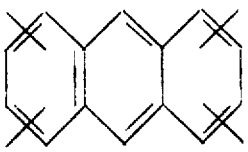

Column 12, line 30, "narrow" should read -- arrow --; Column 12, line 55, the structural formula reading

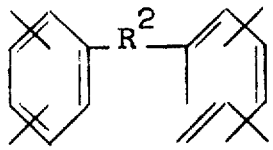         should read         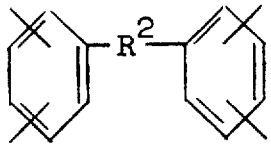

UNITED STATES PATENT OFFICE
CERTIFICATE OF CORRECTION

Patent No. 3,533,997         Dated October 13, 1970

Inventor(s)  Rudolf J. Angelo

It is certified that error appears in the above-identified patent and that said Letters Patent are hereby corrected as shown below:

- page 2 -

Column 13, line 33, the structural formula reading

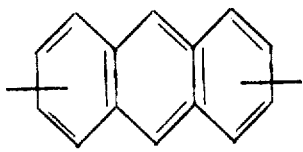     should read     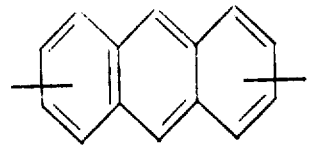

Column 13, line 40, the structural formula reading

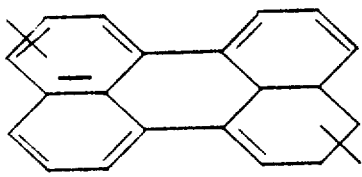     should read     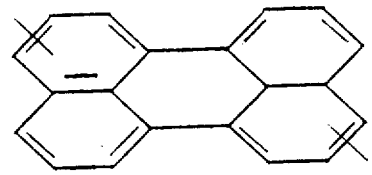

Signed and sealed this 30th day of March 1971.

(SEAL)
Attest:

EDWARD M. FLETCHER, JR.
Attesting Officer

WILLIAM E. SCHUYLER, JR.
Commissioner of Patents